United States Patent
Watanabe et al.

(10) Patent No.: US 6,542,917 B1
(45) Date of Patent: Apr. 1, 2003

(54) STORAGE APPARATUS

(75) Inventors: Ichiro Watanabe, Kawasaki (JP); Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/476,286

(22) Filed: Dec. 30, 1999

(30) Foreign Application Priority Data

Mar. 11, 1999 (JP) ............................................ 11-064624

(51) Int. Cl.[7] .................................................. G06F 7/38
(52) U.S. Cl. ....................................................... 708/605
(58) Field of Search ................................ 708/605, 500

(56) References Cited

U.S. PATENT DOCUMENTS

| | | | |
|---|---|---|---|
| 4,734,878 A | * 3/1988 | Sutcliffe | 708/605 |
| 4,757,467 A | * 7/1988 | Dieterich et al. | 708/605 |
| 4,949,296 A | * 8/1990 | Malinowski | 708/605 |
| 5,268,857 A | * 12/1993 | Chen et al. | 708/605 |
| 5,434,809 A | * 7/1995 | Taniguchi | 708/605 |
| 6,163,791 A | * 12/2000 | Schmookler et al. | 708/605 |

FOREIGN PATENT DOCUMENTS

| | | |
|---|---|---|
| JP | 9305380 | 11/1997 |
| JP | 10302275 | 11/1998 |

* cited by examiner

*Primary Examiner*—Tan V. Mai
(74) *Attorney, Agent, or Firm*—Greer, Burns & Crain, Ltd.

(57) ABSTRACT

An approximate value calculating unit is provided for a storage apparatus in which a seek control is performed by speed controlling a head. When a square root arithmetic operation is needed in the calculation of a seek speed target value which is used in the seek control, the approximate value calculating unit divides a range of an input value x serving as a target of the square root arithmetic operation into a plurality of intervals, sets a polynomial of degree N to approximately output a square root $\sqrt{x}$ of the input value x as an approximate function every interval, and calculates the square root approximate value of the input value x by selectively using the approximate function corresponding to the interval to which the input value x belongs. Further, according to the range dividing method of the input value x, it is sufficient that the polynomial of degree N or the approximate function by the reference table is prepared only for the basic range, and there is no need to prepare the approximate function which covers the range before the input value x. Even when the square root approximate value for the input value x belonging to the range out of the basic range is obtained by executing the input scale conversion and output scale conversion, the approximate function prepared for the basic range can be used.

7 Claims, 17 Drawing Sheets

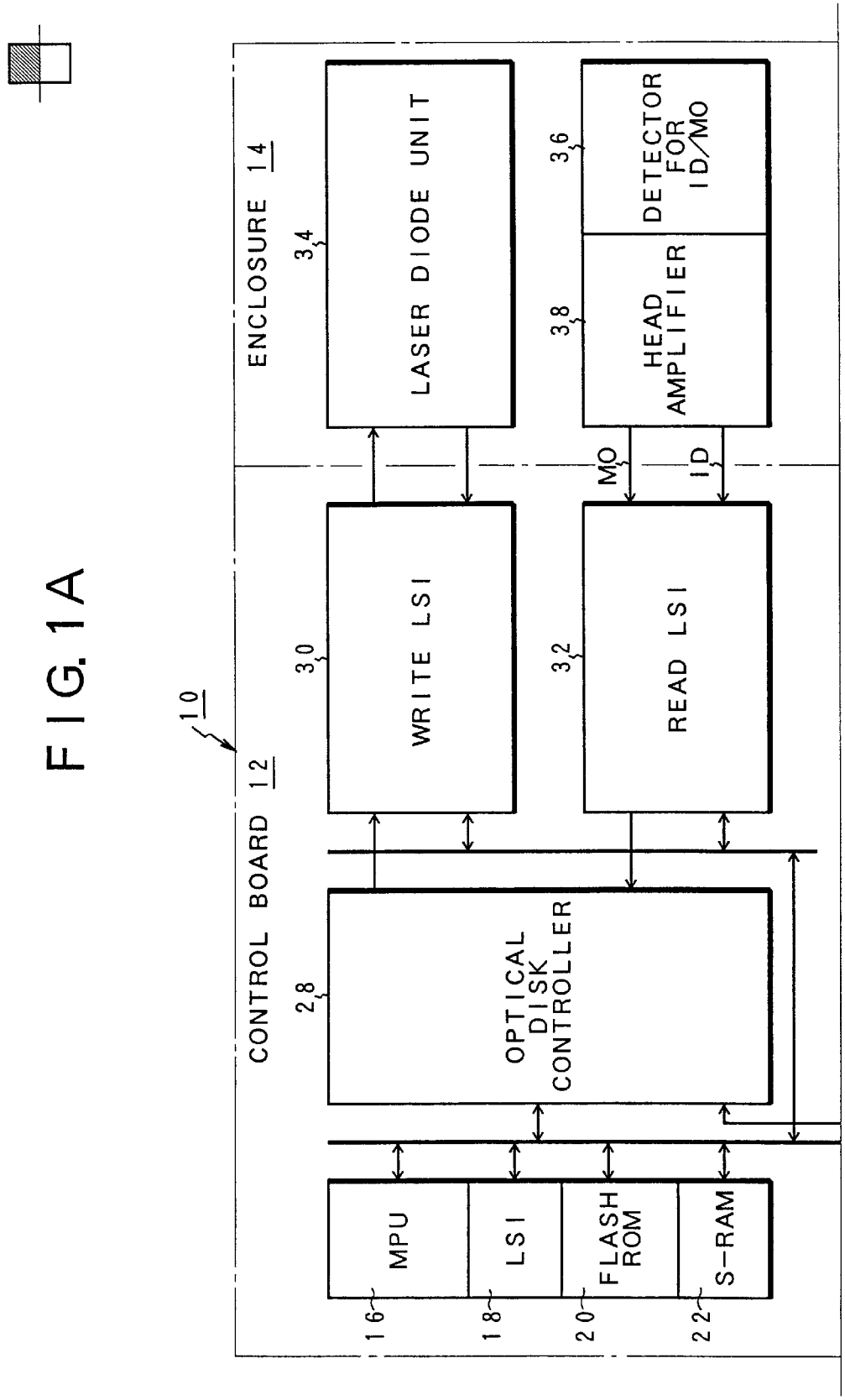

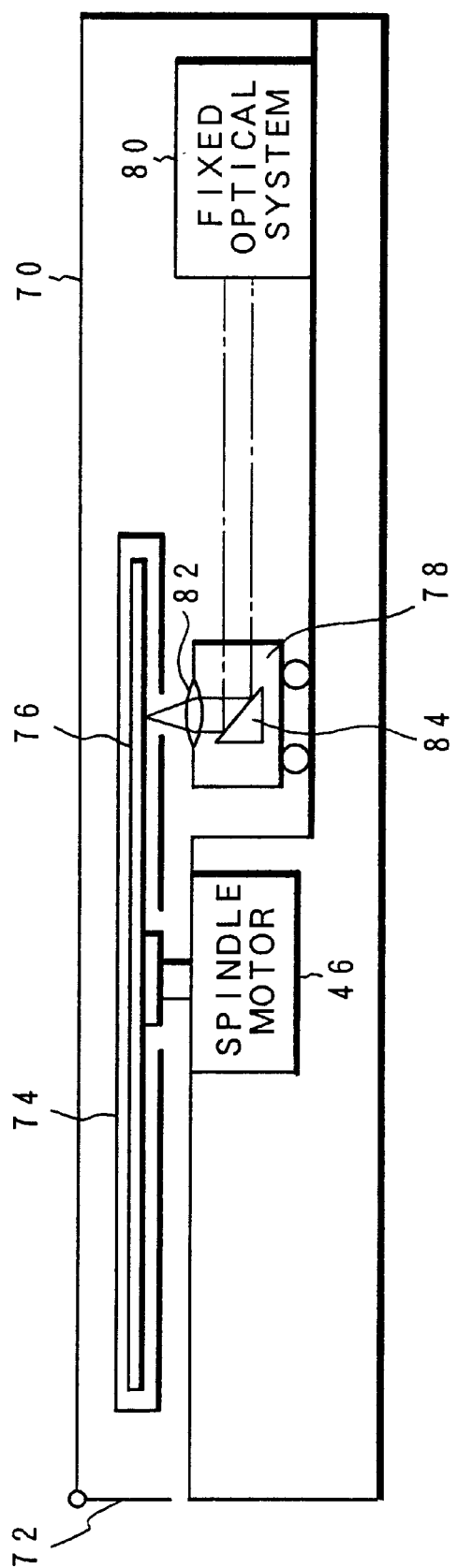

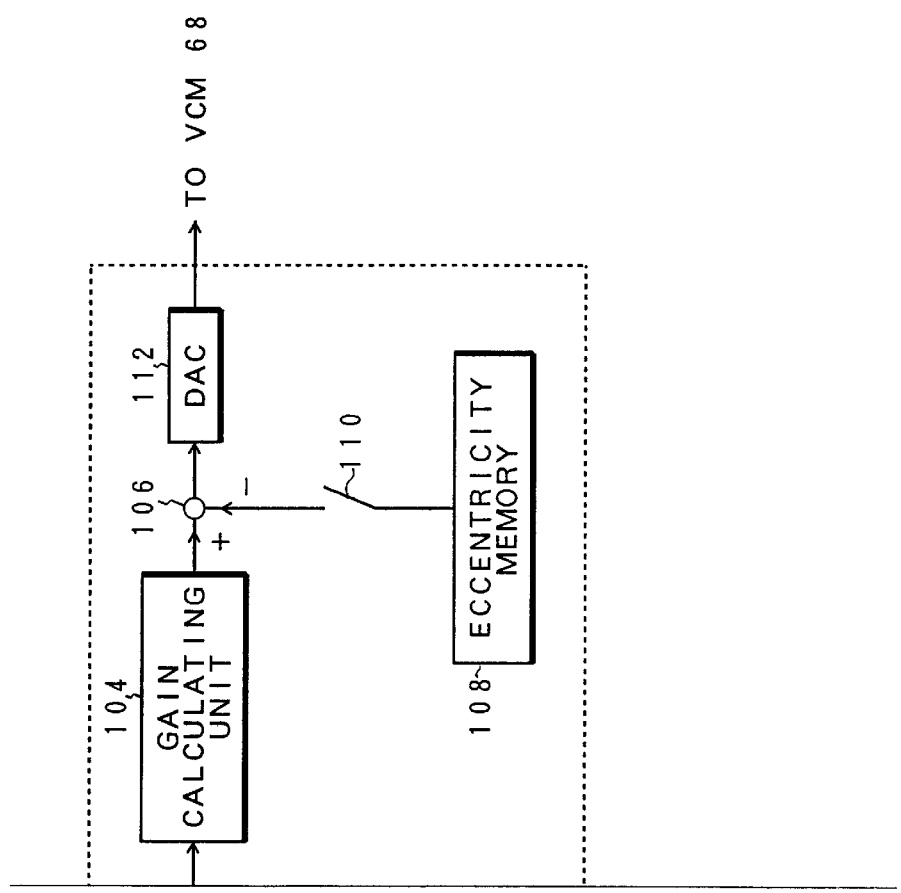
FIG. 3B

F I G. 5A
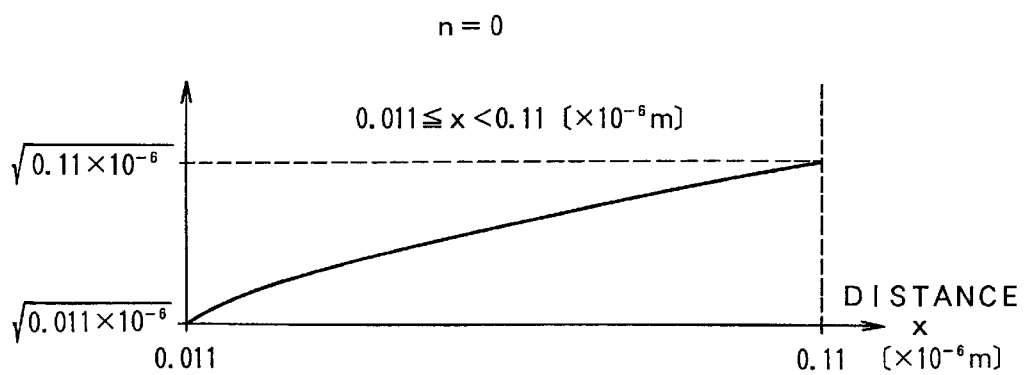
F I G. 5B
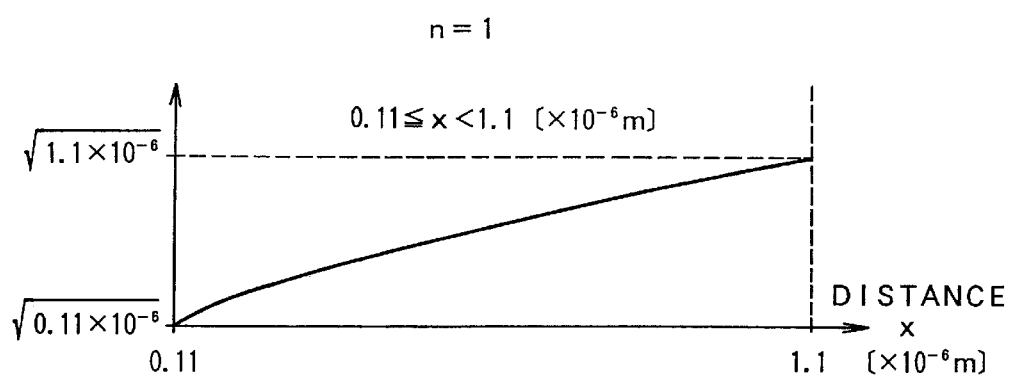
F I G. 5C
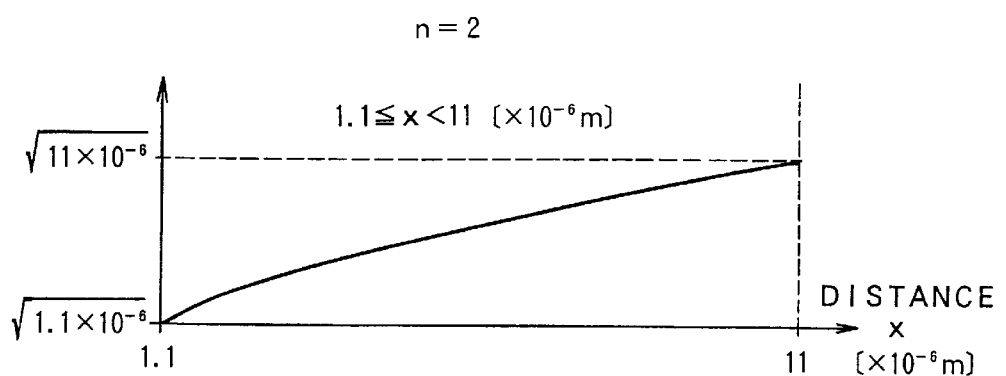

FIG. 9

| INTERVAL ($k^n \cdot X_0 \leq x < k^{n+1} \cdot X_0$) | n |
|---|---|
| $0.00011e-6 \leq x < 0.0011e-6$ | −2 |
| $0.0011e-6 \leq x < 0.011e-6$ | −1 |
| $0.011e-6 \leq x < 0.11e-6$ | 0 |
| $0.11e-6 \leq x < 1.1e-6$ | 1 |
| $1.1e-6 \leq x < 11e-6$ | 2 |
| $11e-6 \leq x < 110e-6$ | 3 |
| $110e-6 \leq x < 1100e-6$ | 4 |
| $1100e-6 \leq x < 11000e-6$ | 5 |
| $11000e-6 \leq x < 110000e-6$ | 6 |
| $110000e-6 \leq x < 1100000e-6$ | 7 |

FIG. 15

| RESIDUAL DISTANCE x | BASIC APPROXIMATE FUNCTION |
|---|---|
| 0.011e−6 | $\sqrt{0.011e-6}$ |
| 0.022e−6 | $\sqrt{0.022e-6}$ |
| 0.033e−6 | $\sqrt{0.033e-6}$ |
| 0.044e−6 | $\sqrt{0.044e-6}$ |
| 0.055e−6 | $\sqrt{0.055e-6}$ |
| 0.066e−6 | $\sqrt{0.066e-6}$ |
| 0.077e−6 | $\sqrt{0.077e-6}$ |
| 0.088e−6 | $\sqrt{0.088e-6}$ |
| 0.099e−6 | $\sqrt{0.099e-6}$ |
| 0.110e−6 | $\sqrt{0.110e-6}$ |

152

STORAGE APPARATUS

BACKGROUND OF THE INVENTION

1. Field of the Invention

The present invention relates to a storage apparatus for performing a speed control of a head and performing a seek control and, more particularly, to a storage apparatus in which a square root arithmetic operation is required in calculation of a seek speed target value that is used in the seek control.

2. Description of the Related Arts

An optical disk has been attracted as a storage medium serving as a core of multimedia which have rapidly been developed in recent years. For example, in case of an MO cartridge of 3.5 inches, the MO cartridges of 128 MB, 230 MB, 540 MB, 640 MB, and the like have been provided. An optical disk drive using such an MO cartridge has been provided as an external storage apparatus of a personal computer of a desktop type. Further, the use of the optical disk drive in a notebook sized personal computer having excellent portability which has recently rapidly been spread is also strongly desired. Therefore, in order to equip the optical disk drive as a standard external storage apparatus, the realization of a small size, a thin size, and a low price is further requested.

In the optical disk drive, a head mechanism of a linear driving type is provided in the direction which transverses tracks of a medium. The head mechanism comprises a fixed optical system fixed to a casing and a movable optical system which is linearly driven by a VCM. The movable optical unit mounted on a carriage has a mechanism for moving an objective lens in the vertical direction by a current supply to a focusing coil. In the head mechanism of such a conventional optical disk drive, at the time of the seek control to move a laser beam to a target track, a speed control to perform acceleration, constant speed setting, and deceleration is performed by the driving of the carriage by the VCM. Just before the laser beam reaches the target track, a pull-in control to the target track is performed and a tracking control for allowing the laser beam to trace the target track is performed.

In the conventional seek control, a seek speed target value Vt in a decelerating interval is generally obtained by, for example, $$Vt=\sqrt{(2ax)}$$

where, x: residual distance to, for example, the target track
a: deceleration

A square root calculation is needed. Although a DSP is ordinarily used in the seek control, the square root calculation in the DSP has a large load. For example, in the DSP of a fixed point, a calculating time of about 10 $\mu$sec is required per calculation of the square root.

SUMMARY OF THE INVENTION

According to the invention, there is provided a storage apparatus in which a square root calculation to give a seek speed target value is simplified, thereby realizing a decrease in calculation amount and a high processing speed.

A storage apparatus of the invention comprises a seek control unit for performing a speed control of a head and performing a seek control and an approximate value calculating unit. When a square root arithmetic operation is needed in a calculation of the seek speed target value which is used in the seek control, the approximate value calculating unit divides a range of an input value x serving as an arithmetic operation target of the square root arithmetic operation into a plurality of intervals, sets an approximate function to approximately output the square root of the input value x every interval, and selectively uses the approximate function corresponding to the interval to which the input value x belongs, thereby calculating the square root approximate value of the input value x. In this manner, according to the invention, since the square root of the input value x is calculated by a polynomial of degree N such as two or three of the input value x and approximated, it is sufficient to perform the arithmetic operation of the polynomial by the DSP by only the repetition of an adding cycle. Consequently, a calculation amount of one approximate calculation of the square root is small, it can be calculated for a short time, and a calculation load of the DSP can be reduced.

The approximate value calculating unit approximates a square root $f(x)=\sqrt{x}$ by a piecewise function $$f(x)=f_n\hat{}(x),\ k^n \cdot X_0 \leq x < k^{n+1} \cdot X_0$$

where, n: integer showing an interval number
k: constant
$X_0$: arbitrary value showing a basic value of an interval boundary of the input value x Although the approximate function is expressed by "$\hat{f}_n(x)$", it is expressed as "$f_n\hat{}(x)$" in the specification.

The approximate value calculating unit defines the piecewise function $$f_0\hat{}(x),\ X_0 \leq x < kX_0$$

of an interval number n=0 as a basic approximate function and approximates intervals of the interval numbers except for the interval number n=0 by a piecewise function $$f_n\hat{}(x)=\sqrt{k^n} \cdot f_0\hat{}(x/(k)^n),\ k^n \cdot X_0 \leq x < k^{n+1} \cdot X_0$$

using the basic approximate function $f_0\hat{}(x)$. The approximate value calculating unit uses the polynomial of degree N corrected so as to prevent a discontinuous change in approximate value at each boundary position in the divided range. That is, the approximate value calculating unit uses a polynomial corrected so as to set errors $e_1$ and $e_2$ of the approximate values at boundary positions P and Q in the divided range to 0. In this manner, according to the invention, by merely setting one fundamental approximate function (basic approximate function) for the divided basic range ($X_0 \leq x < k \cdot X_0$) of the input value x and performing a simple mapping conversion $\{x/(k^n)\}$ of the input value x to the basic range, the same approximate function can be applied even to the other ranges of the input value x. Owing to the above feature, as compared with the case of forming the approximate function for the whole area of the range of the input value x, higher approximate precision is obtained by a smaller degree in the case where the polynomial of degree N is set to the approximate function.

In the approximate value calculating unit, with respect to the basic range when the range of the input value x serving as an arithmetic operation target of the square root arithmetic operation is divided into a plurality of intervals, namely, the range which is defined by $$X_0 \leq x < k \cdot X_0$$

where, k: constant $X_0$: arbitrary value showing a basic value of an interval boundary of the input value x the correspondence relation between the input value x serving as an arithmetic operation target of the square root arithmetic operation and the square root value of the input value x are previously stored into a table.

At the time of the actual square root arithmetic operation, an input scale conversion to convert the input value x to a corresponding value in the basic range is performed to the input value x, and the square root approximate value for the converted value is obtained by referring to the table. An output scale conversion to convert the square root approximate value for the converted value to a square root approximate value for the actual input value x is performed, and the square root approximate value corresponding to the actual input value x is calculated. In this case as well, by merely setting one basic reference table for the divided basic range ($X_0 \leq x < k \cdot X_0$) in the input value x and performing a simple mapping conversion $\{x/(k^n)\}$ of the input value to the basic range, the same reference table can be used even in the other ranges of the input value x. Owing to this feature, as compared to the case of forming the reference table for the whole area of the range of the input value x, a memory capacity for the table is reduced. The approximate value calculating unit sets the constant k to decide the boundary value of the range to be divided to, for example, $10^n$ or $2^n$.

The above and other objects, features, and advantages of the present invention will become more apparent from the following detailed description with reference to the drawings.

BRIEF DESCRIPTION OF THE DRAWINGS

FIGS. 1A and 1B are block diagrams of an optical disk drive to which the invention is applied;

FIG. 2 is an explanatory diagram of an internal structure of the optical disk drive in FIGS. 1A and 1B;

FIGS. 3A and 3B are functional block diagrams of a position servo system which is realized by a DSP in FIGS. 1A and 1B;

FIGS. 5A to 5C are correspondence explanatory diagrams of a basic approximate function and the other approximate functions according to the invention;

FIG. 9 is an explanatory diagram of intervals of ranges which are discriminated by an interval discriminating unit in FIG. 8 and interval numbers n;

FIG. 15 is an explanatory diagram of the table which is used in FIG. 14.

DETAILED DESCRIPTION OF THE PREFERRED EMBODIMENTS

Figure 1B:
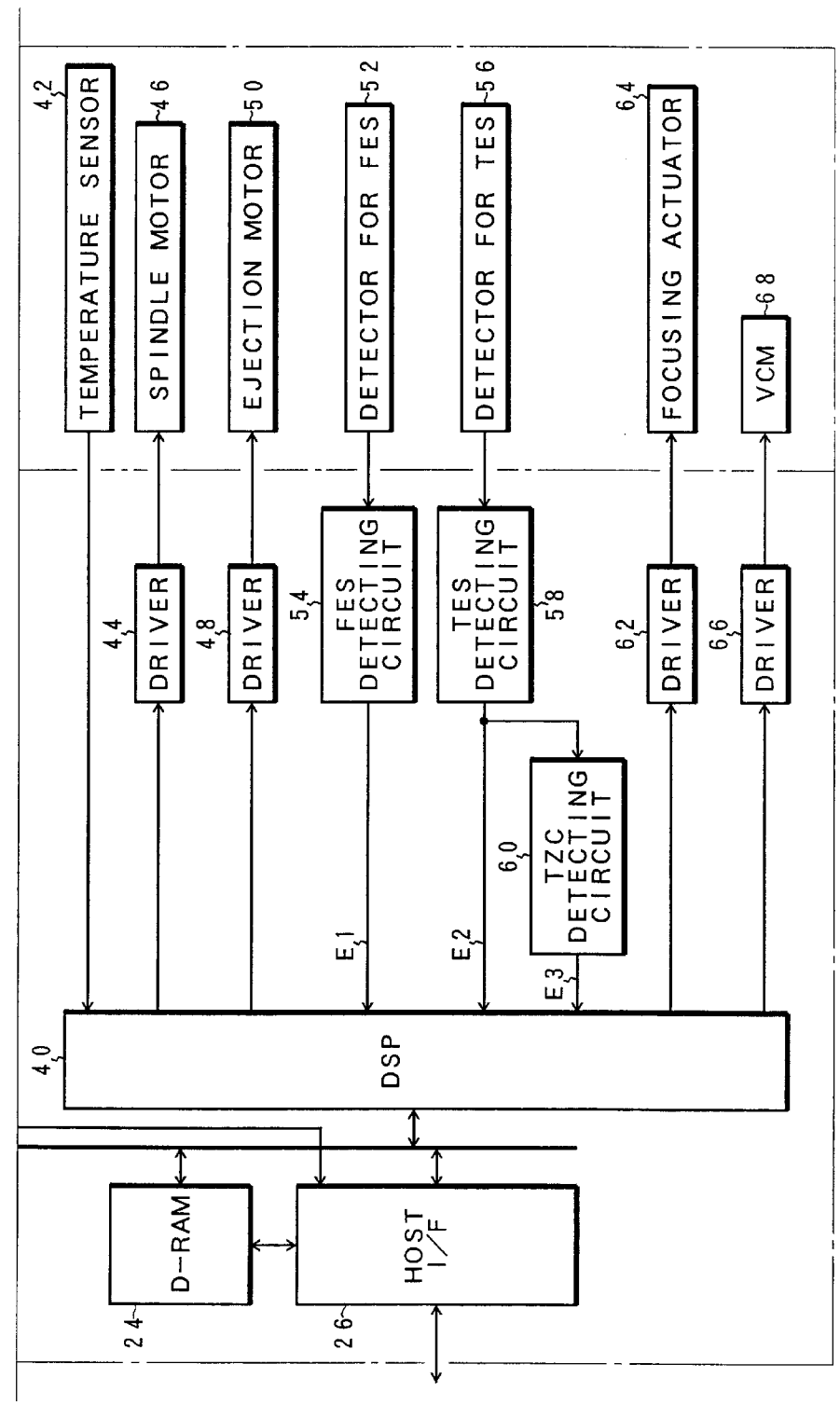

FIGS. 1A and 1B show block diagrams of an optical disk drive 10. The optical disk drive comprises a control board 12 and an enclosure 14. The control board 12 includes: an MPU 16 for controlling the whole optical disk drive; a host interface 26 for transmitting and receiving commands and data to/from an upper apparatus; and an optical disk controller (ODC) 28 and a DSP 40 for performing processes which are necessary to write and read data to/from an optical disk medium. A control logic 18, a flash ROM 20, an S-RAM 22, and a D-RAM 24 are provided for the MPU 16. The D-RAM 24 functions as a buffer memory and, further, assures a data buffer area which is used for a cache control. The optical disk controller 28 forms an ECC code from NRZ write data on a sector unit basis and, after that, converts it to, for example, a 1–7 RLL code. At the time of read access, the controller 28 inversely 1–7 RLL converts the read data of the sector unit, detects and corrects an error of the data by the ECC code, and transfers NRZ read data to the upper apparatus. A write LSI 30 is provided for the optical disk controller 28. A laser diode control output from the write LSI 30 is supplied to a laser diode unit 34 provided for an optical unit on the enclosure 14 side. As a reading system for the optical disk controller 28, a read LSI 32 is provided and a read demodulating circuit and a frequency synthesizer are built therein. A photosensing signal of return light of the laser beam from the laser diode by a detector 36 for ID/MO provided for the enclosure 14 is supplied as an ID signal and an MO signal to the read LSI 32 through a head amplifier 38. The read demodulating circuit of the read LSI 32 has circuit functions of an AGC circuit, a filter, a sector mark detecting circuit, and the like, forms a read clock and read data from the inputted ID signal and MO signal, and demodulates PPM data or PWM data to the original NRZ data. The read data demodulated by the read LSI 32 is supplied to the reading system of the optical disk controller 28 and is transferred as an NRZ data stream to the upper apparatus. A detection signal of a temperature sensor 42 provided on the enclosure 14 side is supplied to the MPU 16 via the DSP 40.

The MPU 16 controls each of light emitting powers for reading, writing, and erasing of the laser diode to the optimum value on the basis of an environmental temperature in the apparatus detected by the temperature sensor 42. The MPU 16 controls a spindle motor 46 provided on the enclosure 14 side by a driver 44 through the DSP 40. When an MO cartridge is ejected, the MPU 16 also controls a driver 48 through the DSP 40 and drives an ejection motor 50, thereby ejecting the MO cartridge. The DSP 40 performs a seek control and an on-track control for seeking the laser beam to a target track so as to enter an on-track state.

In order to realize a servo function of the DSP 40, a detector 52 for FES for receiving the return light of the laser beam from the medium is provided for the optical unit on the enclosure 14 side. An FES detecting circuit (focusing error signal detecting circuit) 54 forms a focusing error signal E1 from a photosensing output of the detector 52 for FES and supplies it to the DSP 40. A detector 56 for TES for receiving the return light of the laser beam from the medium is provided for the optical unit on the enclosure 14 side. A TES detecting circuit (tracking error signal detecting circuit) 58 forms a tracking error signal E2 from a photosensing output of the detector 56 for TES and supplies it to the DSP 40. The tracking error signal E2 is sent to a TZC detecting circuit (track zero-cross point detecting circuit) 60, by which a track zero-cross pulse E3 is formed and supplied to the DSP 40. Further, the DSP 40 drives a focusing actuator 64 and a VCM (carriage actuator) 68 through drivers 62 and 66 in order to control the position of a beam spot on the medium.

An outline of the enclosure 14 in the optical disk drive is as shown in FIG. 2. The spindle motor 46 is provided in a housing 70. By inserting an MO cartridge 74 from an inlet door 72 side to a hub of a rotary axis of the spindle motor 46, an MO medium 76 in the MO cartridge is attached to the hub of the rotary axis of the spindle motor 46 and loaded. A carriage 78 constructing a positioner of a single driving type is provided below the MO medium 76 of the loaded MO cartridge 74. The carriage 78 is arranged so as to be movable in the direction which transverses the tracks on the medium by the VCM 68 in FIGS. 1A and 1B. An objective lens 82 is mounted on the carriage 78. The laser beam from the laser diode provided for a fixed optical system 80 is inputted to the objective lens 82 through a standing mirror 84 and a beam spot is formed on the medium surface of the MO medium 76. Although the objective lens 82 can be moved in the optical axial direction by the focusing actuator 64 in FIGS. 1A and 1B, it is fixed so as not to be moved in the medium radial direction and moved integratedly with the carriage 78.

Figure 3A:
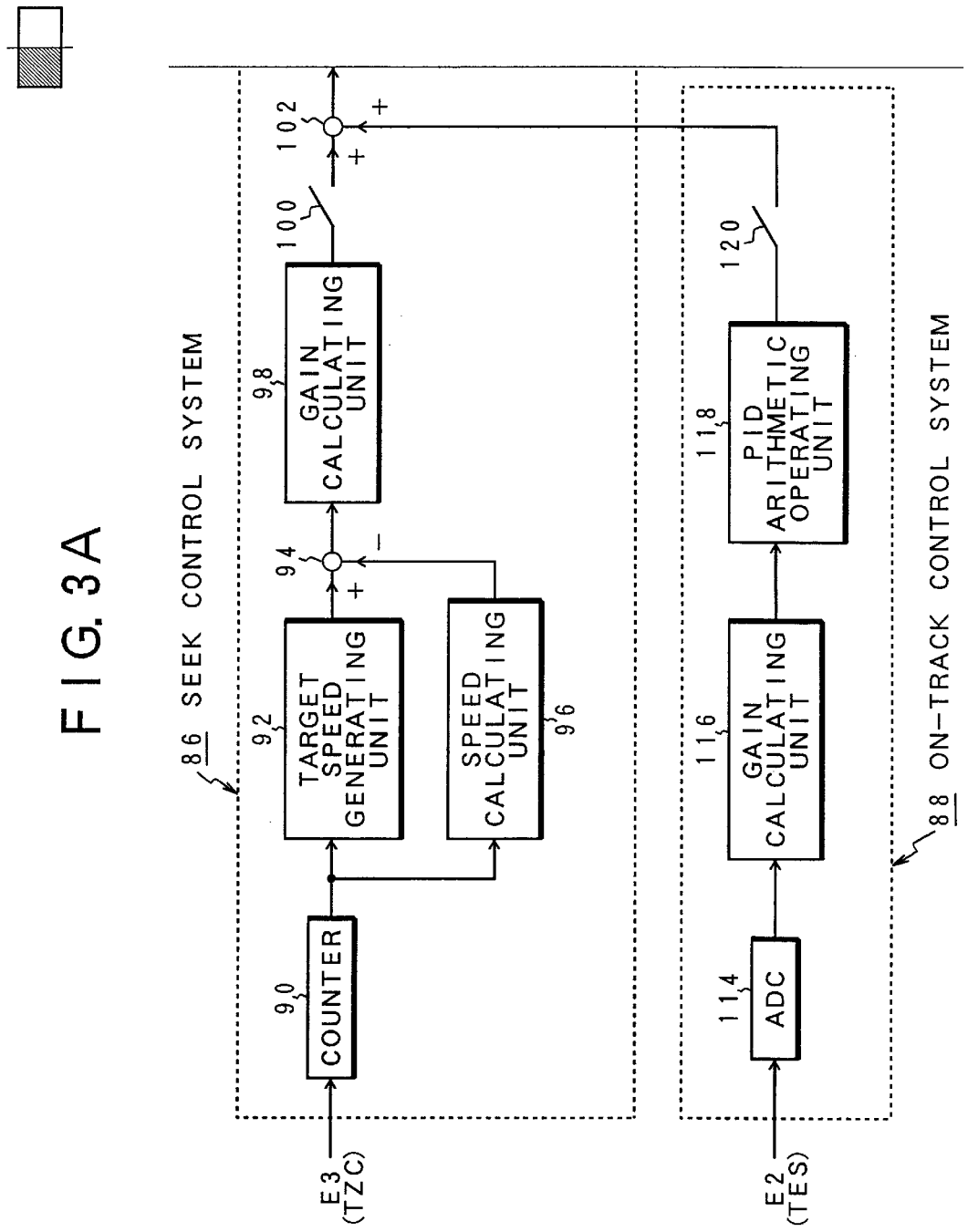

FIGS. 3A and 3B are block diagrams of a servo system which is realized by the DSP 40 in FIGS. 1A and 1B and is provided for the optical disk drive 10. The servo system comprises a seek control system 86 for mainly performing a speed control and an on-track control system 88 for mainly performing a position control. The seek control system 86 comprises: a TZC counter 90; a target speed generating unit 92; an adder 94; a speed calculating unit 96; a gain calculating unit 98; a servo switch 100; an addition point 102; a gain calculating unit 104; an adder 106; an eccentricity memory 108; a servo switch 110; and a D/A converter 112. The on-track control system 88 comprises: an A/D converter 114; a gain calculating unit 116; a PID arithmetic operating unit (feedback arithmetic operating unit) 118; and a servo switch 120. When the seek control is performed, the servo switch 100 provided for the seek control system 86 is turned on to validate the speed control and the servo switch 120 provided for the on-track control system 88 is turned off to cancel the on-track control. When the seek control is performed, the analog switch 110 of the eccentricity memory 108 is also turned off, so that an eccentricity correction is not performed. The speed control by the seek control system 86 is performed in a manner such that a target speed corresponding to the number of residual tracks within a range from the track on which the laser beam is positioned at present to the target track is generated to the addition point 94 by the target speed generating unit 92, a speed error between the target speed and the laser beam speed calculated by the speed calculating unit 96 at that time is obtained, predetermined gains are multiplied to the speed error by the gain calculating units 98 and 104, the resultant data is converted to an analog signal by the D/A converter 112, and after that, a driving current is supplied to the VCM 68 through the driver, thereby performing the speed control. The target speed generating unit 92 generates a seek speed target value corresponding to the residual distance to the target track, thereby performing a speed control to switch the speed to the acceleration, constant speed, and deceleration. When the laser beam approaches the center of the target track during the deceleration by the seek control system 86, the servo switch 100 in the ON-state so far is turned off, and the servo switch 120 in the OFF-state so far is turned on, thereby disconnecting the speed control and switching the control mode to the position control by the on-track control system 88 and pulling the laser beam to the center of the target track. The pull-in control by the on-track control system 88 is performed as follows. A gain is applied by the gain calculating unit 116 to the TES signal E2 that is obtained by the A/D converter 114 as a feedback signal. After that, arithmetic operations of proportion, integration, and differentiation are performed by the PID arithmetic operating unit 118, a gain is further applied by the gain calculating unit 104, after that, the resultant signal is converted to an analog signal by the D/A converter 112, and the driving current is supplied to the VCM 68, thereby performing the pull-in control of the positioner. As for the on-track control after the laser beam was pulled to the track center of the target track, in a manner similar to the pull-in control, by turning on the servo switch 120 and turning off the servo switch 100 and, further, turning on the servo switch 110, the eccentricity correction by an output of the eccentricity memory 108 is performed at the addition point 106, thereby performing the on-track control to allow the laser beam to trace the track center by the driving of the positioner by the VCM 68.

Figure 4:
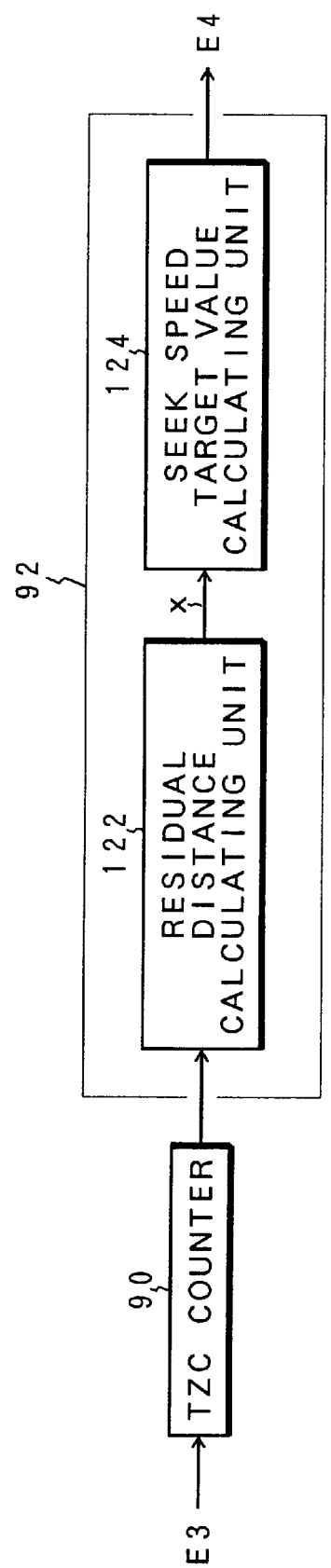
FIG. 4 is a block diagram of a seek control system to which the invention is applied.

FIG. 4 shows the target speed generating unit 92 provided for the seek control system 86 in FIGS. 3A and 3B together with the TZC counter 90. The target speed generating unit 92 comprises a residual distance calculating unit 122 and a seek speed target value calculating unit 124. The TZC counter 90 receives the track zero-cross pulse E3 from the TZC detecting circuit 60 in FIGS. 1A and 1B and counts the number of tracks transversed by the laser beam during the seeking operation. The residual distance calculating unit 122 obtains the number of residual tracks to the target track by calculating a difference between the target number of tracks and the current count number which is generated from the TZC counter 90 and multiplies the number of residual tracks by the track pitch, thereby calculating the residual distance as an input value x serving as an arithmetic operation target of the square root arithmetic operation. In the calculation of the input value x, since the input value x becomes a value quantized by the track pitch if the number of residual tracks is merely multiplied by the track pitch, a value between the count numbers of the number of residual tracks is interpolated. Therefore, the residual distance calculating unit 122 calculates the input value x at a resolution that is lower than the track pitch. The seek speed target value calculating unit 124 calculates the seek speed target value Vt corresponding to the square root of the input value x which is generated from the residual distance calculating unit 122 and which serves as an arithmetic operation target of the square root arithmetic operation. In the seek speed target value calculating unit 124 of the invention, a range of the input value x serving as an arithmetic operation of the square root arithmetic operation is divided into a plurality of intervals, a polynomial of degree N to approximately generate the square root of the input value x is set as an approximate function every interval, the approximate function corresponding to the interval to which the input value x from the residual distance calculating unit 122 belongs is selected, an approximate value of the square root of the input value x is obtained, and the seek speed target value Vt is finally calculated from the square root approximate value and generated.

A principle of the approximate calculation using the polynomial of degree N of the square root of the invention which is applied to the seek speed target value calculating unit 124 in FIG. 4 will now be described as follows. In the seek control, the seek speed target value Vt which is generated in the target speed generating unit 92 is given by the following equation and the square root calculation is needed.

$$Vt = \sqrt{(2ax)} \tag{1}$$

where, x: input value serving as an arithmetic operation target of the square root arithmetic operation a: deceleration It is now considered that the calculation of the square root to obtain the seek speed target value Vt is performed by an approximate expression. First, it is considered that $f(x)=\sqrt{x}$ is approximated by the piecewise function as follows.

$$f\hat{}(x) = f_n\hat{}(x), \; k^n \cdot X_0 \leq x < k^{n+1} \cdot X_0 \tag{2}$$

where, n: integer showing the interval number

Now, assuming that $f(x)=\sqrt{x}$, owing to the nature of $\sqrt{}$, there is the following relation.

$$f(k^n \cdot x) = \sqrt{(k^n \cdot x)} = \sqrt{(k^n)} \cdot \sqrt{x} = \sqrt{(k^n)} \cdot f(x) \tag{3}$$

In order to describe the relation, three neighboring interval ranges in which k=10, $X_0$=0.011e−6, and n=0, 1, 2 are shown in FIGS. 5A, 5B, and 5C, respectively. In this instance, an axis of abscissa indicates an interval range of the input value x in each interval. An axis of ordinate shows a value of the square root $\sqrt{x}$ for the input value x. As will be obviously understood from the interval range shown in the expression (2), the range of x covered by each of the adjacent intervals becomes larger by k times each time the value of the interval n increases. Since FIGS. 5A, 5B, and 5C show the case where k=10 and $X_0$=0.011e−6, the interval corresponding to n=0 is equivalent to a range from 0.011e−6 to 0.11e−6, the interval corresponding to n=1 is equivalent to a range from 0.11e−6 to 1.1e−6, and the interval corresponding to n=2 is equivalent to a range from 1.1e−6 to 11e−6. In this manner, the range of the input value x covered by each of the adjacent intervals becomes a range of 10 times each time the value of the interval n increases. When the case of n=0 in FIG. 5A is set to a reference, the range of the input value x which the interval n covers and the input value x included in this range are increased by $k^n$ times. As for the value of the square root $\sqrt{x}$, as will be understood from the equation (3) and FIGS. 5A to 5C, when the value of the square root for the interval n is $\sqrt{(k^n)}$ times as large as the value of the square root for the interval 0. As shown in FIGS. 5A to 5C, when the relation between the input value x and the output value $\sqrt{x}$ for the interval n is shown by setting the scale of the axis of abscissa to a value obtained by multiplying the interval 0 by $\{1/(k^n)\}$ times and setting the scale of the axis of ordinate to a value obtained by multiplying the interval 0 by $\{1/\sqrt{(k^n)}\}$ times, their functional waveforms coincide. Therefore, when the function $f_0\hat{}(x)$ to approximate $f(x)=\sqrt{x}$ is prepared (hereinbelow, $f_0\hat{}(x)$ is called a basic approximate function) for only the interval $(X_0 \leq x < k \cdot X_0)$ of the interval number n=0, namely, if $$f_0\hat{}(x), \; X_0 \leq x < k \cdot X_0 \tag{4}$$

is prepared, the other intervals n are obtained by using the basic approximate function $f_0\hat{}(x)$ as follows.

$$f_n\hat{}(x) = \sqrt{(k^n)} \cdot f_0\hat{}(x/(k^n)), \; k^n \cdot X_0 \leq x < k^{n+1} \cdot X_0 \tag{5}$$

The basic approximate function $f_0\hat{}(x)$ in the expression (4) is approximated by the polynomial of degree N by the method of least squares. In case of a quadratic polynomial, it is approximated as follows.

$$f_0\hat{}(x) = \alpha \cdot x^2 + \beta \cdot x + \gamma, \; X_0 \leq x < k \cdot X_0 \tag{6}$$

In the quadratic polynomial, as a basic approximate function $f_0\hat{}(x)$ in the case where k=10 and $X_0$=0.011e−6[m], the following approximate equation is obtained by the method of least squares.

$$f_0\hat{}(x) = -1.065e10 \cdot x^2 + 3.457e3 \cdot x + 7.642e-5, \; 0.011e-6 \leq x < 0.11e-6 \tag{7}$$

The expression (7) is a function obtained by approximating the $\sqrt{}$ function within the range of (0.011e−6 ≤ x < 0.11−6). 0.011e−6[m] denotes $0.011 \times 10^{-6}$[m].

Figure 6A:
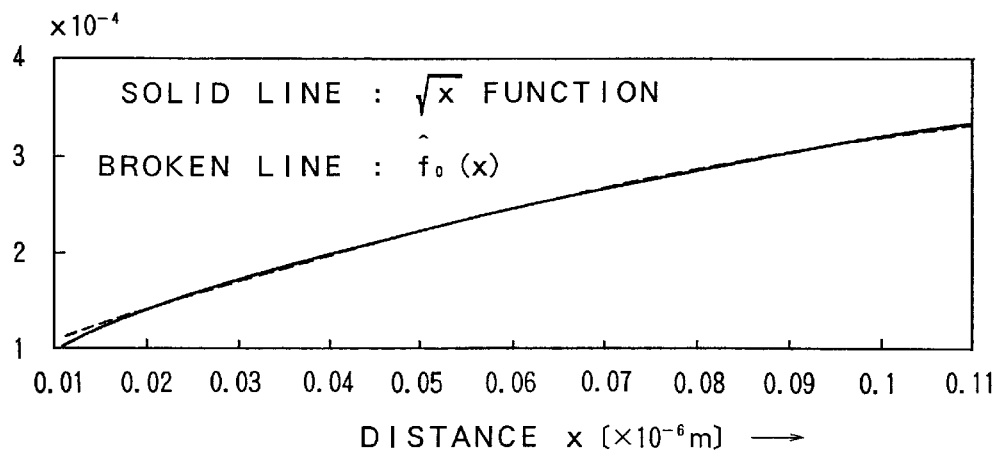
FIGS. 6A to 6C are characteristics diagrams of a seek speed target value approximation, a speed approximate error, and a speed approximate error ratio in the case where a square root is approximated by a quadratic polynomial.
Figure 6B:
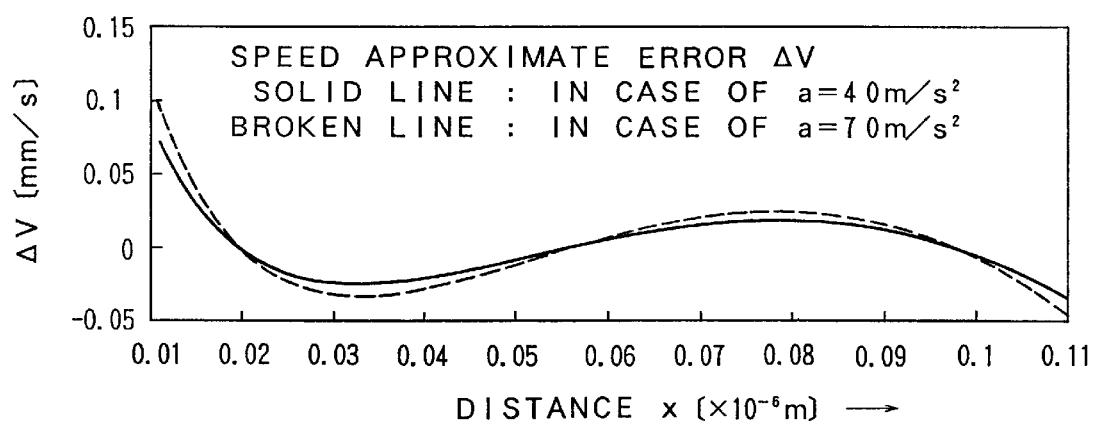
Figure 6C:
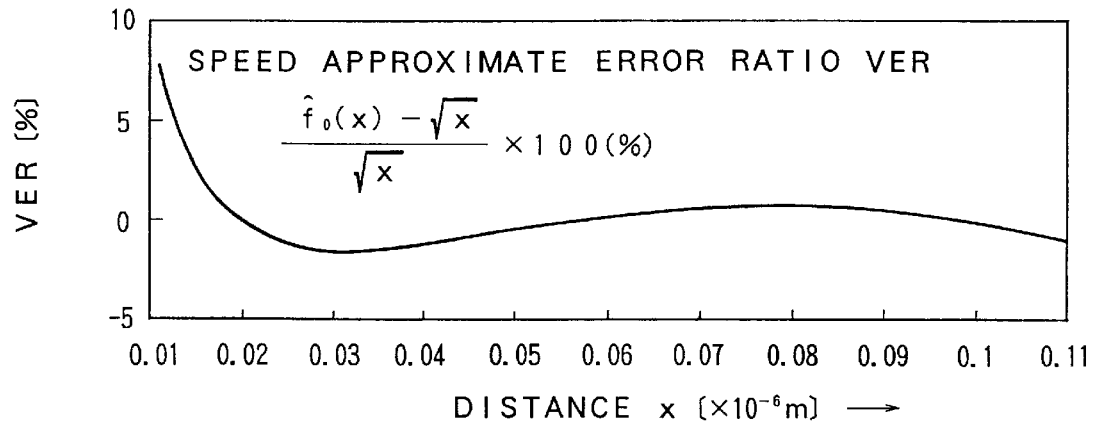

FIGS. 6A to 6C show relations between the $\sqrt{x}$ function in the basic range and the basic approximate function $f_0\hat{}(x)$ of the expression (7). In FIG. 6A, characteristics shown by a solid line denote the $\sqrt{x}$ function and characteristics shown by a broken line denote the basic approximate function $f_0\hat{}(x)$ of the expression (7). FIG. 6B shows a speed approximation error $\Delta V$ in case of calculating the target speed Vt by using the approximate function which is given by the expression (7). That is, the seek speed target value Vt is obtained by $$Vt = \sqrt{(2ax)} \tag{8}$$

The seek speed target value approximation $Vt\hat{}$ using the approximate function of the expression (7) is $$Vt\hat{} = \sqrt{(2a)} \cdot \sqrt{(2a)} \cdot f_0\hat{}(x) \tag{9}$$

The speed approximation error $\Delta V$ as a difference between them is obtained by $$\Delta V = Vt\hat{} - Vt \tag{10}$$

The speed approximation error $\Delta V$ of the solid line relates to the case of the deceleration a=40 [m/sec$^2$] and the speed approximation error $\Delta V$ of the broken line relates to the case of the deceleration a=70 [m/sec$^2$]. Further, FIG. 6C shows a speed approximation error ratio VER[%] of the basic approximate function $f_0\hat{}(x)$ for the $\sqrt{x}$ function of the solid line in FIG. 6A and is given by $$VER = [\{f_0\hat{}(x) - \sqrt{x}\}/\sqrt{x}] \times 100[\%] \tag{11}$$

Now, considering the speed approximation error ratio VER in FIG. 6C, in the basic approximate function $f_0\hat{}(x)$ in the expression (7), it is possible to approximate by an error of maximum 8% for the $\sqrt{x}$ function. FIGS. 6A to 6C show diagrams regarding the basic approximate function $f_0\hat{}(x)$ of the interval number n=0 corresponding to the range of (0.011e−6 ≤ x < 0.11e−6). In the intervals other than the interval of n=0, it is possible to calculate by substituting the basic approximate function $f_0\hat{}(x)$ in the expression (7) for the piecewise function in which the interval numbers n=1, 2, 3, 4, . . . are substituted into the expression (5). Although the speed approximation error ratio VER shown in FIG. 6C is shown for the range of the interval n=0, even with respect to the other intervals n, the speed approximation error ratio VER is held as it is as will be obviously understood from the expressions (3), (5), and (11). The error ratio of the approximate function for the true value $\sqrt{x}$ can be reduced by increasing the number of intervals, namely, by decreasing the value of constant k or increasing the value of degree of the polynomial of degree N.

Figure 7A:
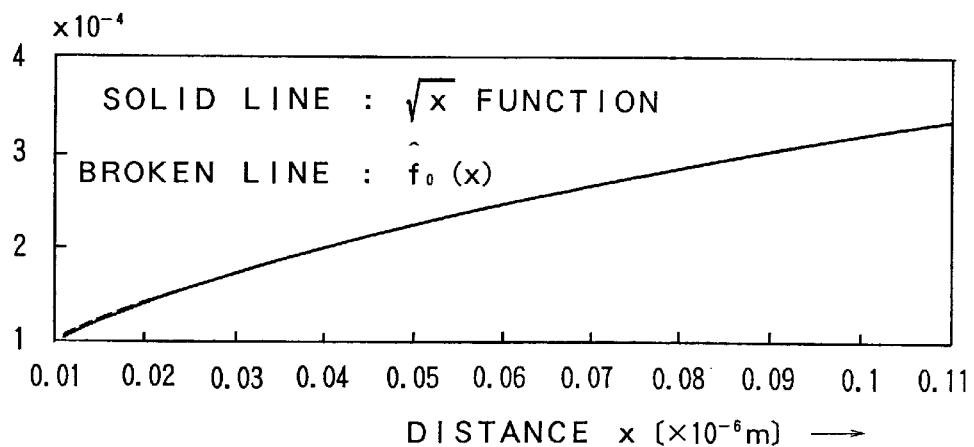
FIGS. 7A to 7C are characteristics diagrams of a seek speed target value approximation, a speed approximate error, and a speed approximate error ratio in the case where a square root is approximated by a cubic polynomial.
Figure 7B:
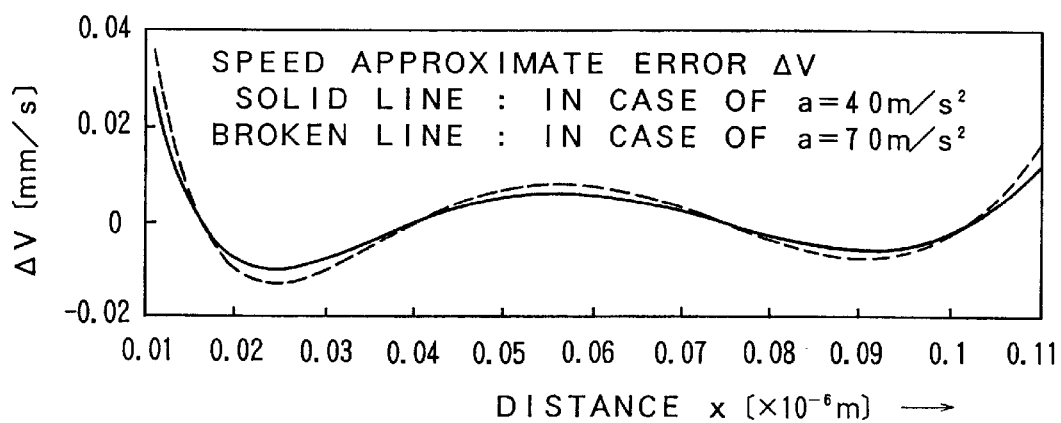
Figure 7C:
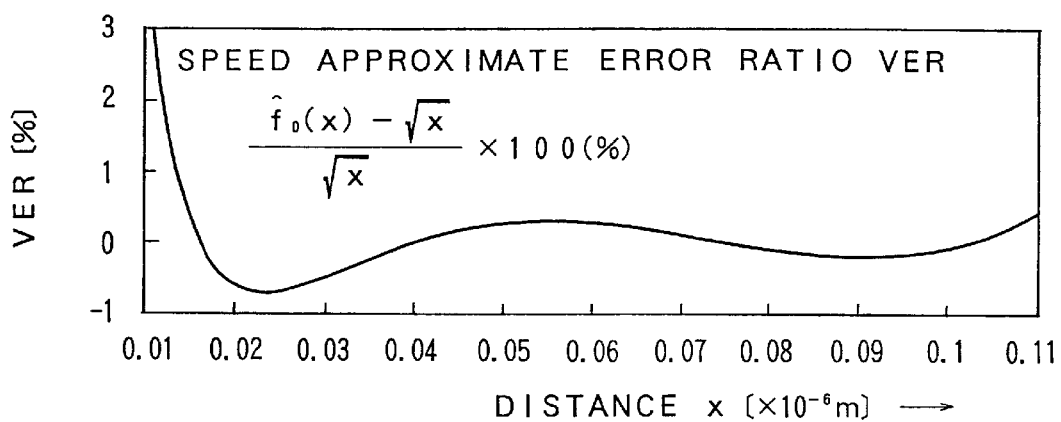

FIGS. 7A to 7C relate to the case where the basic approximate function $f_0\hat{\ }(x)$ is set to the following cubic polynomial.

$$f_0\hat{\ }(x)=\alpha \cdot x^3 + \beta \cdot x^2 + \gamma \cdot x + 67, \; X_0 \leq x < k \cdot X_0 \quad (12)$$

Now, assuming that k=10 and $X_0=0.011e-6$ [m], the expression (12) can be approximated by the following expression.

$$f_0\hat{\ }(x)=1.088e17 \cdot x^3 - 3.020e10 \cdot X^2 + 4.480e3 \cdot x + 6.222e-5, \; 0.011e-6 \leq x < 0.11e-6 \quad (13)$$

FIG. 7A shows an approximate function in which a solid line indicates the $\sqrt{x}$ function and a broken line indicates an approximate function of the equation (13). FIG. 7B shows the speed approximation error $\Delta V$ calculated from the equations (8) to (10) with respect to FIG. 7A, a solid line shows the case of the deceleration a=40 [m/sec$^2$], and a broken line shows the case of the deceleration a=70 [m/sec$^2$] in a manner similar to FIG. 6. Further, FIG. 7C shows the speed approximation error ratio VER calculated from the equation (11) with respect to the $\sqrt{x}$ function and the basic approximate function $f_0\hat{\ }(x)$ in FIG. 7A. In the case where the basic approximate function $f_0\hat{\ }(x)$ is approximated by the cubic polynomial of the expression (13) as mentioned above, the error ratio can be reduced to 3% or less as shown in FIG. 7C.

Figure 8:
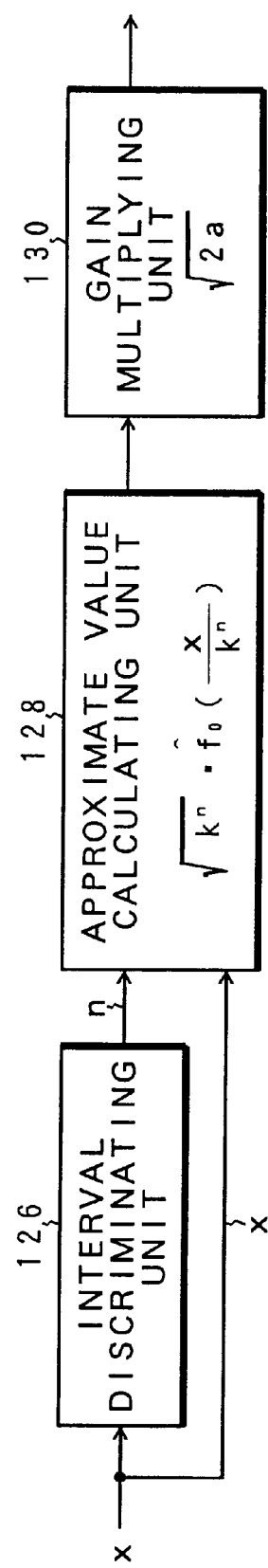
FIG. 8 is a block diagram of a seek speed target value calculating unit in FIG. 4 according to the invention.

FIG. 8 is a functional block diagram of the seek speed target value calculating unit 124 in FIG. 4 and the seek speed target value approximation is calculated by the approximate function of the $\sqrt{\ }$ function based on the expression (5) and outputted. The seek speed target value calculating unit 124 is constructed by an interval discriminating unit 126, an approximate value calculating unit 128, and a gain multiplying unit 130. A case where k=10 and $X_0=0.011e-6$ [m] in the expression (5) will now be described. The interval discriminating unit 126 inputs an input value x as a target of a square root arithmetic operation, discriminates whether it belongs to any of the intervals shown in the expression (5), and outputs the interval number n indicative of the interval. In the example, since k=10 and $X_0=0.011e-6$ [m], the interval is $$10^n \cdot 0.011e-6 \leq x < 10^{n+1} \cdot 0.011e-6$$

The interval discriminating unit 126 discriminates the interval to which the input value x belongs and outputs the interval number n.

FIG. 9 shows an example of an interval discrimination table which is used in the interval discriminating unit 126 in FIG. 8. For example, assuming that the input value x=0.013e-6, n=0 is determined by referring to the table of FIG. 9. If the input value x=0.13e-6, n=1 is decided. Further, when the input value x=1.3e-6, n=2 is decided.

The interval number n decided by the interval discriminating unit 126 in FIG. 8 is sent to the approximate value calculating unit 128 together with the input value x. In this unit, the approximate value of the square root $\sqrt{x}$ is calculated on the basis of the expression (5). For example, the quadratic polynomial shown in the expression (7) is used as a basic approximate function $f_0\hat{\ }(x)$ in the expression (5). The approximate value of the square root $\sqrt{x}$ calculated by the approximate value calculating unit 128 is supplied to the gain multiplying unit 130 and multiplied by a predetermined gain constant $\sqrt{(2a)}$, so that the approximate value of the seek speed target value is outputted. "a" in the gain constant $\sqrt{(2a)}$ denotes the deceleration and $\sqrt{(2a)}$ can be handled as a constant because the deceleration "a" has previously been decided.

Figure 10A:
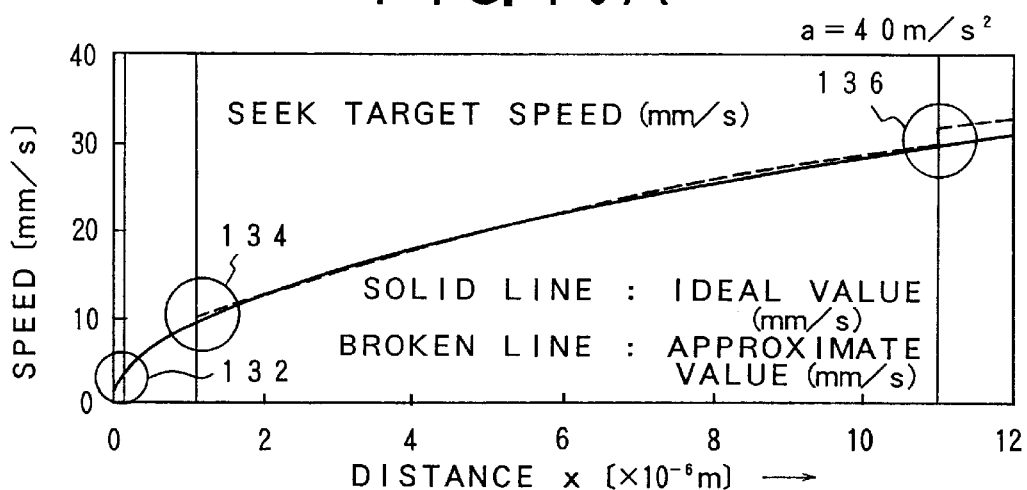
FIGS. 10A to 10C are characteristics diagrams of a seek speed target value approximation and an approximate error occurring by the invention.
Figure 10B:
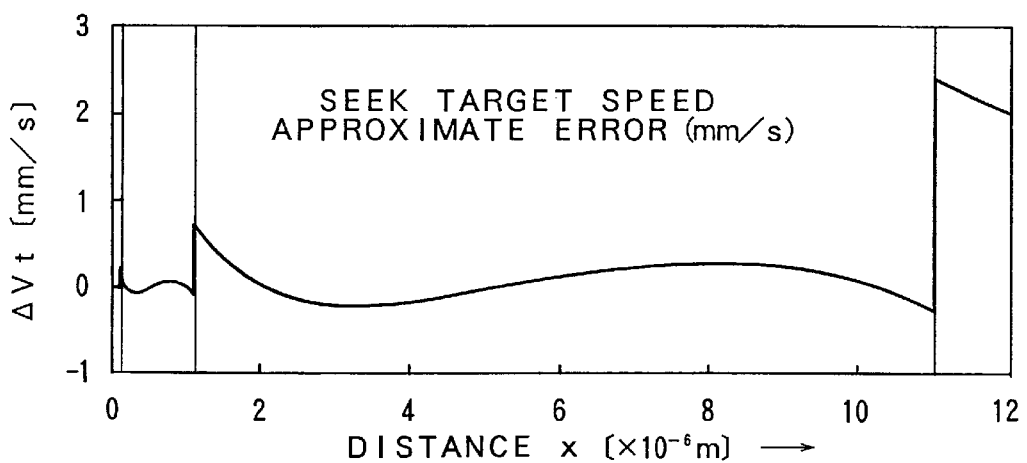
Figure 10C:
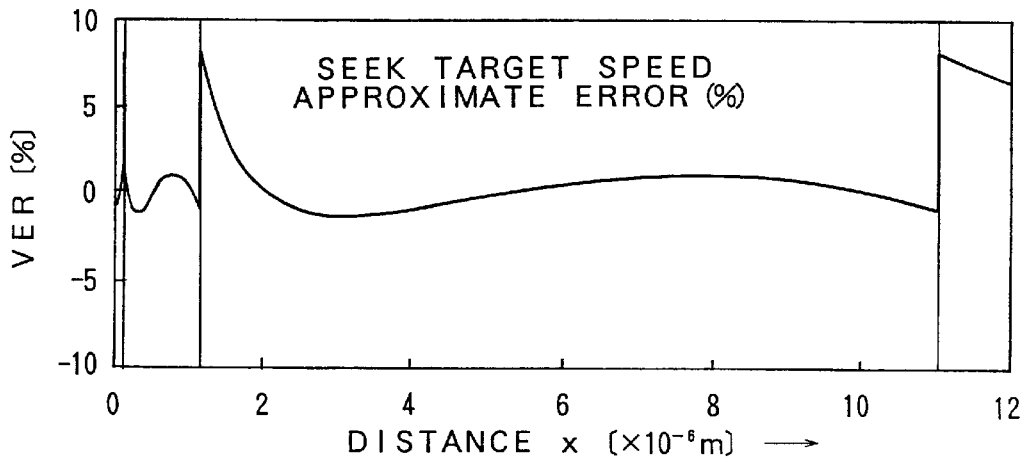

FIGS. 10A to 10C are characteristics diagrams of a result in the case where the seek speed target value is approximated according to the embodiment of FIG. 8. That is, FIG. 10A shows the seek speed target value, a solid line indicates an ideal value using $\sqrt{x}$, and a broken line shows an approximate value according to the invention. FIG. 10B shows a seek speed target approximate error $\Delta Vt$ obtained by subtracting the ideal value from the approximate value in FIG. 10A. Further, FIG. 10C shows the ratio VER of the seek speed target value approximate error and it is obtained by $$VER = \{(Vt\hat{\ } - Vt)/Vt\} \times 100 [\%]$$

When considering the result obtained by approximating the seek speed according to the invention in FIGS. 10A to 10C, the input values x serving as boundary values of the intervals shown by circles 132, 134, and 136 in FIG. 10A are equal to 0.011e-6, 0.11e-6, 1.1e-6, . . . [m] and the interval number n changes to n=0, 1, 2, 3, . . . by the interval discriminating unit 126 in FIG. 8. Therefore, as shown in FIGS. 10B and 10C, an inconvenience such that an approximate error which changes discontinuously occurs in the switching portion where the value of n changes and becomes discontinuous occurs. A discontinuity occurs in a seek speed error which is used for the speed control due to the discontinuity in the approximate value of the seek speed target value, so that noises are generated in an instruction current to the carriage actuator and there is a case where an inconvenience occurs. In the invention, therefore, an approximate polynomial in which no approximate error occurs at both ends of the interval is used. The reason why the approximate value discontinuously changes in the switching of the interval is because the approximate errors occur at both ends of the interval and the approximate errors at both ends are different. Therefore, by correcting the basic approximate function $f_0\hat{\ }(x)$ so as to set the approximate errors at both ends of the interval to 0, it is possible to prevent that the errors become discontinuous in the switching of the interval.

Figure 11:
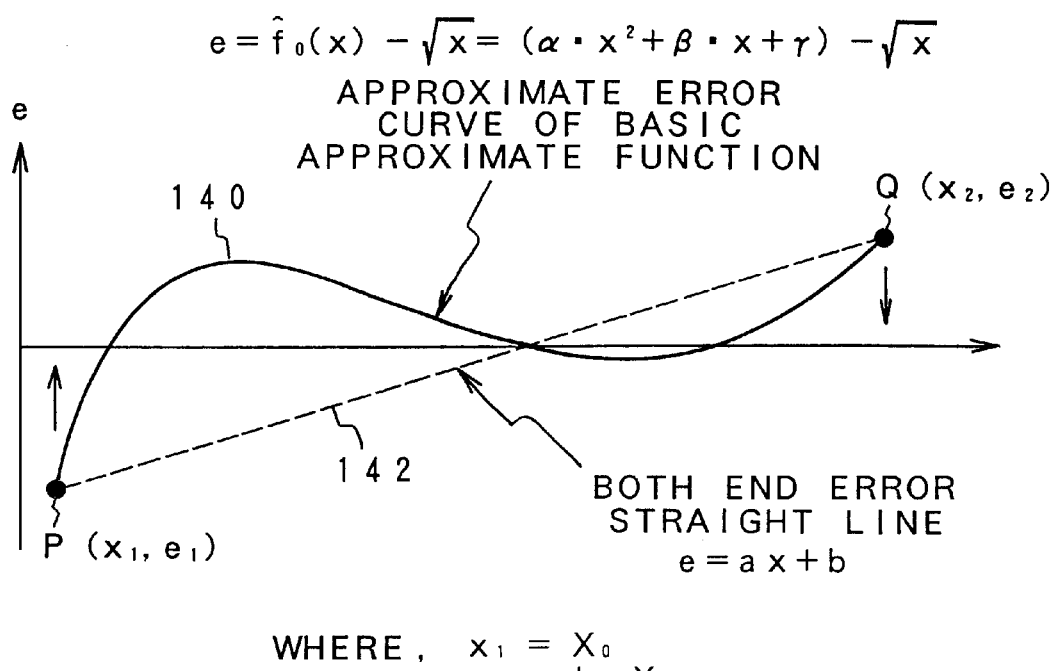
FIG. 11 is an explanatory diagram of a method of setting errors at both ends of an interval to zero.

FIG. 11 shows a principle to calculate an approximate polynomial in which no approximate error occurs at both ends of the interval. A solid line 140 shows approximate error characteristics in the basic range of the basic approximate function shown in FIGS. 6B and 7B. In FIGS. 6B and 7B, to show the speed error, since the characteristics multiplied by $\sqrt{(2a)}$, namely, $$\Delta V = \sqrt{(2a)} \cdot e$$
$$= \sqrt{(2a)} \cdot \{f_0\hat{\ }(x) - \sqrt{x}\}, \quad X_0 \leq x < k \cdot X_0$$

are shown, the dimension of the axis of ordinate differs. It is sufficient to correct the errors at points P and Q at both ends of the approximate error curve 140 to zero as shown by arrows. That is, it is sufficient to subtract linear characteristics of a straight line connecting both end points P and Q from the approximate error curve 140. Coordinate values $e_1$ and $e_2$ of both end points P and Q in FIG. 11 and coefficients a and b of the straight line 142

$$e = ax + b$$

are given by the following equations.

$$e_1 = f_0\hat{\ }(x_1) - \sqrt{x_1}$$

$$e_2 = f_0\hat{\ }(x_2) - \sqrt{x_2}$$

$$a = (e_2 - e_1)/(x_2 - x_1)$$

$$b = e_1 - a \cdot x_1 \quad (14)$$

Thus, in case of the quadratic polynomial, the basic approximate function after the correction is given by the following equation.

$$f_0\hat{\ }^{mod}(x) = \alpha \cdot x^2 + (\beta - a) \cdot x + (\gamma - b) \quad (15)$$

Figure 12A:
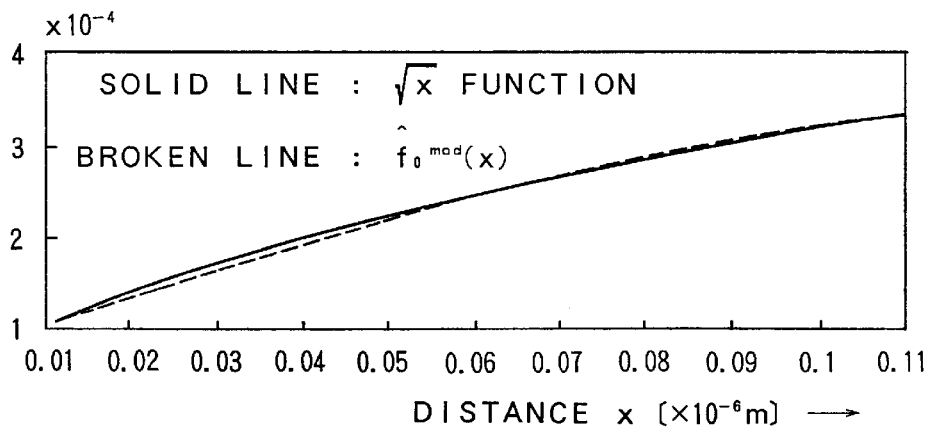
FIGS. 12A to 12C are characteristics diagrams of a seek speed target value approximation, a speed approximate error, and a speed approximate error ratio in the case where the errors at both ends of the interval in FIG. 8 are corrected.
Figure 12B:
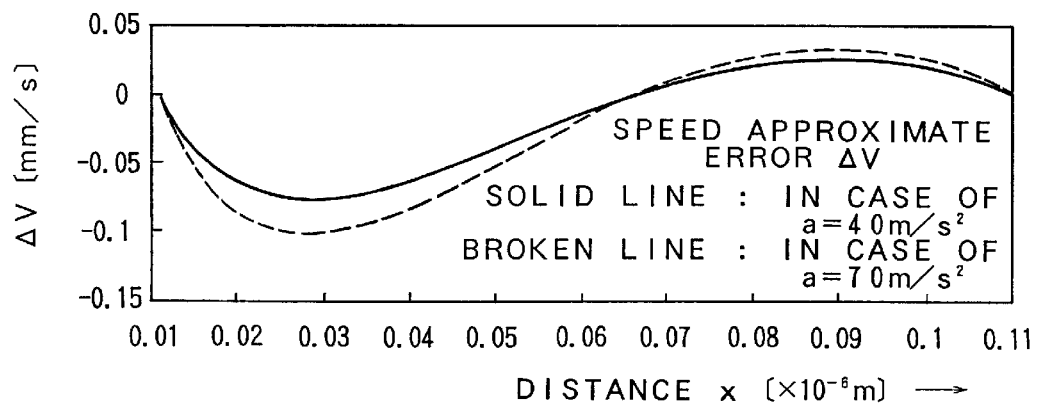
Figure 12C:
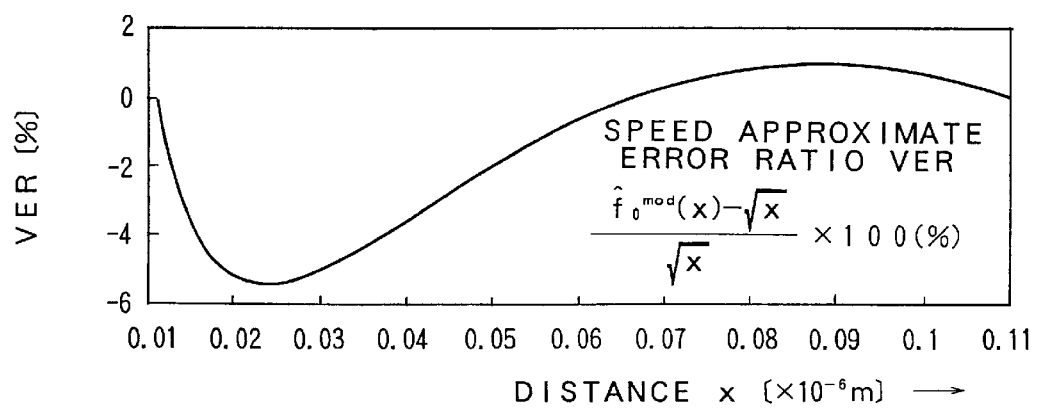

FIGS. 12A to 12C are characteristics diagrams in the case where the approximate polynomial in which no approximate error occurs at both ends of the interval by the equation (11) is applied to the result of FIGS. 6A to 6C. In FIG. 12A, a solid line shows the $\sqrt{x}$ function and a broken line shows a basic approximate function $f_0\hat{\ } mod(x)$ after the correction of the equation (15). FIG. 12B shows the speed approximate error $\Delta V$ of the seek speed target value in the case where the deceleration a is set to 40 [m/sec$^2$] or 70 [m/sec$^2$]. Further, FIG. 12C shows a speed approximate error ratio VER between the $\sqrt{x}$ function and the basic approximate function $f_0\hat{\ } mod(x)$ after the correction in FIG. 12A.

Figure 13A:
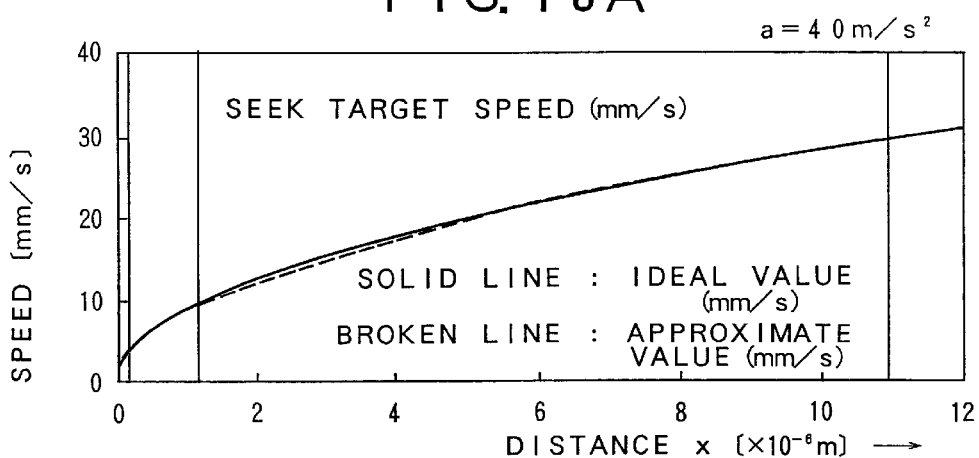
FIGS. 13A to 13C are characteristics diagrams of a seek speed target value approximation and an approximate error for a correction result in FIGS. 12A to 12C.
Figure 13B:
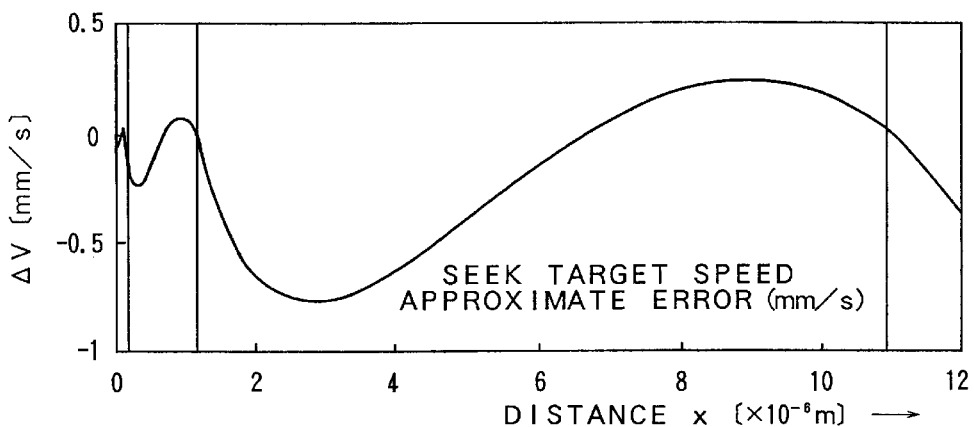
Figure 13C:
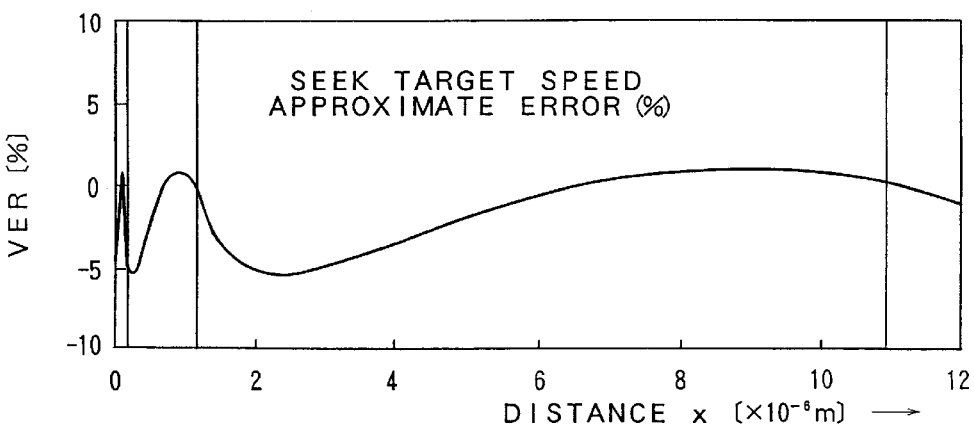

Further, FIGS. 13A to 13C show an approximate value of the seek speed target value in the case where the basic approximate function is corrected as shown in the equation (15) and its error. As will be obviously understood by comparing with FIGS. 10A to 10C before correction, a discontinuous output in the switching of the interval does not occur in this case.

Figure 14:
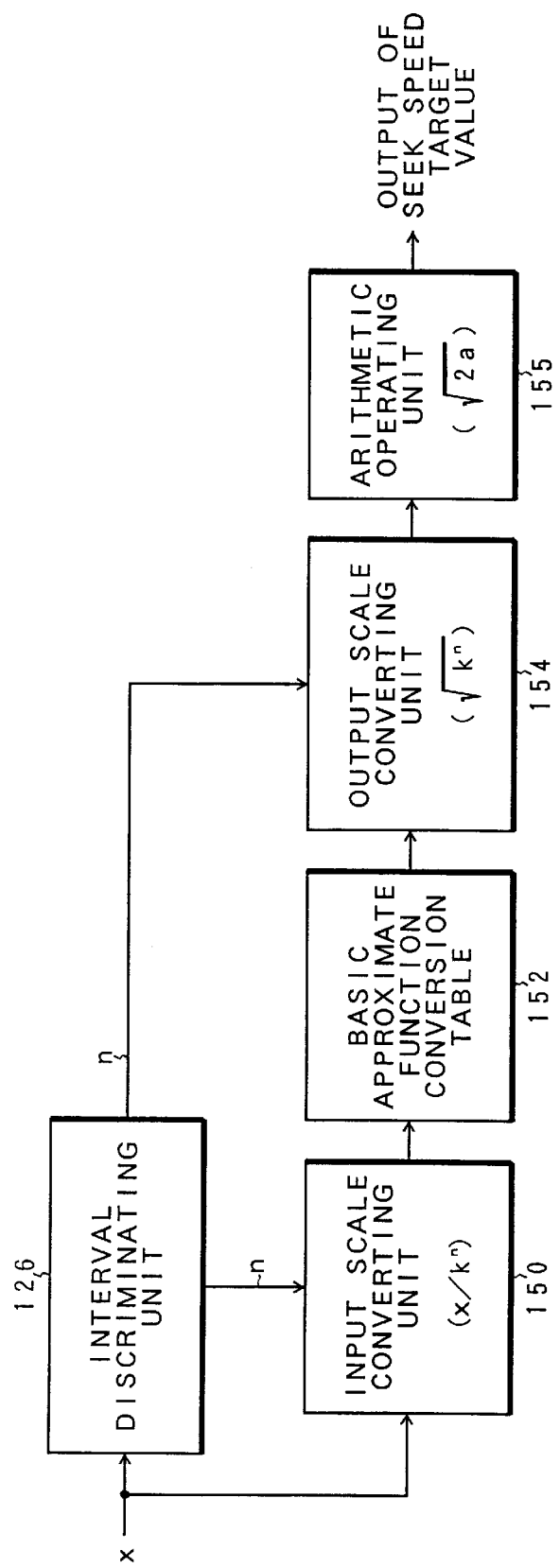
FIG. 14 is a block diagram of another embodiment of the invention to obtain an approximate value of a square root with reference to a table.

FIG. 14 shows another embodiment of the invention and is characterized in that the basic approximate function is obtained with reference to a table. A target speed generating unit in FIG. 14 is constructed by the interval discriminating unit 126, an input scale converting unit 150, a basic approximate function conversion table 152, an output scale converting unit 154, and an arithmetic operating unit 155. The interval discriminating unit 126 is the same as that in the embodiment of FIG. 8 and outputs the interval number n of the interval to which the input value x belongs with reference to, for example, the discrimination table of FIG. 9 due to the input value x. The input scale converting unit 150 calculates $(x/k^n)$ to set the input value x to a corresponding value in the basic range where it is covered by the basic approximate function. The input value x which belongs to the interval (basic range of n=0) of the expression (4) is used as a parameter and the value of the square root $\sqrt{x}$ corresponding thereto has previously been stored in the basic approximate function conversion table 152.

FIG. 15 shows an example of the basic approximate function conversion table 152. With respect to the case where the input value x is increased discontinuously to 10 stages by an increase value of 0.011e−6 at a time from the minimum value 0.011e−6 to the maximum value 0.11e−6, the values $\sqrt{(0.011e-6)}$ to $\sqrt{(0.11e-6)}$ of the square root $\sqrt{x}$ are stored. When the table is referred to, the approximate value of the square root $\sqrt{x}$ for the input value x is outputted by a linear interpolation of the square root value registered in the table. The square root approximate value read out from the basic approximate function conversion table 152 is inputted to the output scale converting unit 154 and multiplied by $\sqrt{(k^n)}$, thereby output scale converting it. Further, the resultant value is multiplied by the gain constant $\sqrt{(2a)}$ by the arithmetic operating unit 155, thereby calculating the approximate value of the seek speed target value and outputting it. The value outputted from the interval discriminating unit 126 is used as a value of n in the coefficient $\sqrt{(k^n)}$ of the output scale conversion in the output scale converting unit 154. By obtaining the basic approximate function with reference to the table, it is sufficient to prepare the conversion table to only a certain specific basic range and it is unnecessary to prepare the table for the whole region of the input range. Therefore, an amount of memory which is used in the conversion table can be remarkably reduced. Although the memory amount generally increases as compared with that in case of using the polynomial of degree N, there is an advantage such that the approximate precision is improved. Although the case of k=10 has been described in the embodiment for simplicity of explanation, it is sufficient to actually set k to an arbitrary positive real number. Particularly, when $k=2^n$, since the interval can be discriminated by comparing the number of bits in the case where the interval discriminating unit 126 in FIGS. 8 and 14 is realized by a DSP or the like, it is desirable from a viewpoint that the processes can be easily and properly performed.

According to the invention as mentioned above, the approximate value calculating unit is provided with respect to the storage apparatus in which the seek control is performed by speed controlling the head, and in the case where the square root arithmetic operation is needed in the calculation of the seek speed target value which is used in the seek control, the range of the input value serving as a target of the square root arithmetic operation is divided into a plurality of intervals, the approximate function to approximate and output the square root of the input value every interval is set, and the polynomial of degree N is used as an approximate function corresponding to the interval to which the input value belongs, thereby obtaining the square root approximate value of the input value. Therefore, the amount of approximate calculations of the square root of one time by the DSP can be reduced, the approximate value can be calculated in a short time, the calculation load of the DSP is remarkably reduced, and so long as the DSP of the same ability, the calculating precision is raised and the speed control by the setting of the more accurate seek speed target value can be realized.

Although the embodiments have been described with respect to the case of using the optical disk drive as a storage apparatus as an example, the invention is not limited to it but can be applied as it is to a proper storage apparatus such as hard disk drive, floppy disk drive, DVD drive, or the like in which the head is seek controlled to the target track. The invention has been described as an example with respect to the single driving type head mechanism in which the objective lens that is driven by the focusing actuator is mounted on the carriage that is driven by the VCM. However, the invention can be applied to a double driving type head mechanism in which the tracking actuator is mounted on the carriage. The invention also incorporates many proper modifications without departing from the objects and advantages of the invention. Further, the invention is not limited by the numerical values shown in the embodiments.

What is claimed is:

1. A storage apparatus comprising:
   a seek control unit for performing a seek control by speed controlling a head; and
   an approximate value calculating unit for, when a square root arithmetic operation is needed in a calculation of a seek speed target value which is used in said seek control, dividing a range of an input value serving as a target of said square root arithmetic operation into a plurality of intervals, setting an approximate function for approximately outputting a square root of said input value every said interval, and selectively using an approximate function corresponding to an interval to which said input value belongs, thereby calculating a square root approximate value of said input value, wherein said approximate value calculating unit approximates a square root $f(x)=\sqrt{x}$ by a piecewise function $$f\hat{}(x)=f_n\hat{}(x), k^n \cdot X_0 \leq x < k^{n+1} \cdot X_0$$

where, n: integer showing an interval number
k: constant
$X_0$: arbitrary value showing a basic value of an interval boundary of the input value x.

2. An apparatus according to claim 1, wherein said approximate value calculating unit defines a piecewise function $$f_0\hat{}(x), X_0 \leq x < k \cdot X_0$$

of an interval number n=0 as a basic approximate function, and approximates by a piecewise function $$f_n\hat{}(x)=\sqrt{k^n} \cdot f_0\hat{}(x/(k)^n), k^n \cdot X_0 \leq x < k^{n+1} \cdot X_0$$

using said basic approximate function $f_0\hat{}(x)$ with respect to intervals other than the interval of the interval number n=0.

3. An apparatus according to claim 2, wherein said approximate value calculating unit sets the constant k to decide a boundary value of said interval range to $2^n$ or $10^n$.

4. An apparatus according to any one of claim 1 or 2, wherein a polynomial of degree N of said input value is used as an approximate value for each of said intervals.

5. An apparatus according to claim 4, wherein a polynomial of degree N corrected so as to prevent a discontinuous change of approximate values at positions before and after a boundary position in said divided range is used as a polynomial of degree N of said input value.

6. An apparatus according to claim 4, wherein a polynomial of degree N corrected so as to set an error of the approximate value at the boundary position in said divided range to 0 is used as a polynomial of degree N corrected so as to prevent a discontinuous change of approximate values at positions before and after a boundary position in said divided range.

7. An apparatus according to claim 1, wherein in said approximate value calculating unit,
an input value x as a target of said square root arithmetic operation and a square root value of said input value are previously stored into a table with respect to a basic range $$X_0 \leq x < k \cdot X_0$$

where, k: constant
$X_0$: arbitrary value showing a basic value at an interval boundary of the input value x
when the range of the input value x as a target of said square root arithmetic operation is divided into said plurality of intervals,
an input scale conversion for converting said input value x to a corresponding value in said basic range is performed to said input value x, a corresponding square root approximate value in said basic range is obtained by referring to said table for the converted input value, an output scale conversion for converting the square root approximate value, which is obtained by referring to said table, to a magnitude of the square root value for said input value x is performed.

* * * * *